United States Patent
Kuo et al.

(10) Patent No.: US 11,809,045 B2
(45) Date of Patent: Nov. 7, 2023

(54) ELECTRONIC DEVICE

(71) Applicant: Innolux Corporation, Miao-Li County (TW)

(72) Inventors: Chih-Chin Kuo, Miao-Li County (TW); Mao-Shiang Lin, Miao-Li County (TW); Yu-Sheng Ho, Miao-Li County (TW); Ying-Jen Chen, Miao-Li County (TW); Chih-Yung Hsieh, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 17/869,800

(22) Filed: Jul. 21, 2022

(65) Prior Publication Data

US 2023/0004032 A1   Jan. 5, 2023

Related U.S. Application Data

(60) Provisional application No. 63/217,420, filed on Jul. 1, 2021.

(30) Foreign Application Priority Data

Dec. 13, 2021   (CN) .......................... 202111518157.X

(51) Int. Cl.
*G02F 1/1337* (2006.01)
*G02F 1/1347* (2006.01)
(Continued)

(52) U.S. Cl.
CPC .......... *G02F 1/1337* (2013.01); *G02F 1/1347* (2013.01); *G02F 1/134309* (2013.01);
(Continued)

(58) Field of Classification Search
CPC ............ G02F 1/1337; G02F 1/134309; G02F 1/1347; G02F 1/1334; G02F 1/1339; G02F 2202/043
See application file for complete search history.

(56) References Cited

U.S. PATENT DOCUMENTS

2012/0044431 A1* 2/2012 Osterman ............ H04N 13/341
                                                                349/15
2021/0318563 A1* 10/2021 Wu ........................ G02F 1/1347

FOREIGN PATENT DOCUMENTS

CN          111948856          11/2020
CN          111983864          11/2020

OTHER PUBLICATIONS

"Office Action of Taiwan Counterpart Application", dated Mar. 20, 2023, pp. 1-6.

* cited by examiner

*Primary Examiner* — James A Dudek
(74) *Attorney, Agent, or Firm* — JCIPRNET

(57) ABSTRACT

Provided is an electronic device including a first liquid crystal layer having a first side and a second side opposite thereto; a second liquid crystal layer disposed on the first liquid crystal layer and having a third side and a fourth side opposite thereto; a first alignment layer disposed on the first side and having a first alignment direction; a second alignment layer disposed on the second side and having a second alignment direction opposite to the first alignment direction; a third alignment layer disposed on the third side and having a third alignment direction; and a fourth alignment layer disposed on the fourth side and having a fourth alignment direction opposite to the third alignment direction. The second alignment layer is between the first liquid crystal (Continued)

layer and the third alignment layer. The third alignment layer is between the second liquid crystal layer and the second alignment layer.

19 Claims, 6 Drawing Sheets

(51) Int. Cl.
    *G02F 1/1343*     (2006.01)
    *G02F 1/1339*     (2006.01)
    *G02F 1/1334*     (2006.01)

(52) U.S. Cl.
    CPC .......... *G02F 1/1334* (2013.01); *G02F 1/1339* (2013.01); *G02F 2202/043* (2013.01)

ELECTRONIC DEVICE

CROSS-REFERENCE TO RELATED APPLICATION

This application claims the priority benefit of U.S. provisional application Ser. No. 63/217,420, filed on Jul. 1, 2021, and China application serial no. 202111518157.X, filed on Dec. 13, 2021. The entirety of each of the above-mentioned patent applications is hereby incorporated by reference herein and made a part of this specification.

BACKGROUND

Technical Field

The disclosure relates to an electronic device.

Description of Related Art

Liquid crystal materials have dielectric anisotropy and optical anisotropy and may be used as light valves, and are also widely used in various electronic devices because of these characteristics. For example, many electronic devices such as displays and optical components utilize liquid crystal molecules to achieve desired optical functions. Recently, liquid crystal materials have been used to make dimmable components, such as dimmable glass.

SUMMARY

According to an embodiment of the disclosure, an electronic device includes a first liquid crystal layer, a second liquid crystal layer, a first alignment layer, a second alignment layer, a third alignment layer, and a fourth alignment layer. The first liquid crystal layer has a first side and a second side, and the first side is opposite to the second side. The second liquid crystal layer is disposed on the first liquid crystal layer and has a third side and a fourth side, and the third side is opposite to the fourth side. The first alignment layer is disposed on the first side and has a first alignment direction. The second alignment layer is disposed on the second side and has a second alignment direction. The first alignment direction is opposite to the second alignment direction. The third alignment layer is disposed on the third side and has a third alignment direction. The fourth alignment layer is disposed on the fourth side and has a fourth alignment direction. The third alignment direction is opposite to the fourth alignment direction. The second alignment layer is located between the first liquid crystal layer and the third alignment layer, and the third alignment layer is located between the second liquid crystal layer and the second alignment layer.

In order to make the above-mentioned features and advantages of the disclosure more comprehensible, the following embodiments are described in detail below with the accompanying drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure, and together with the description serve to explain principles of the disclosure.

DESCRIPTION OF EMBODIMENTS

Figure 1:
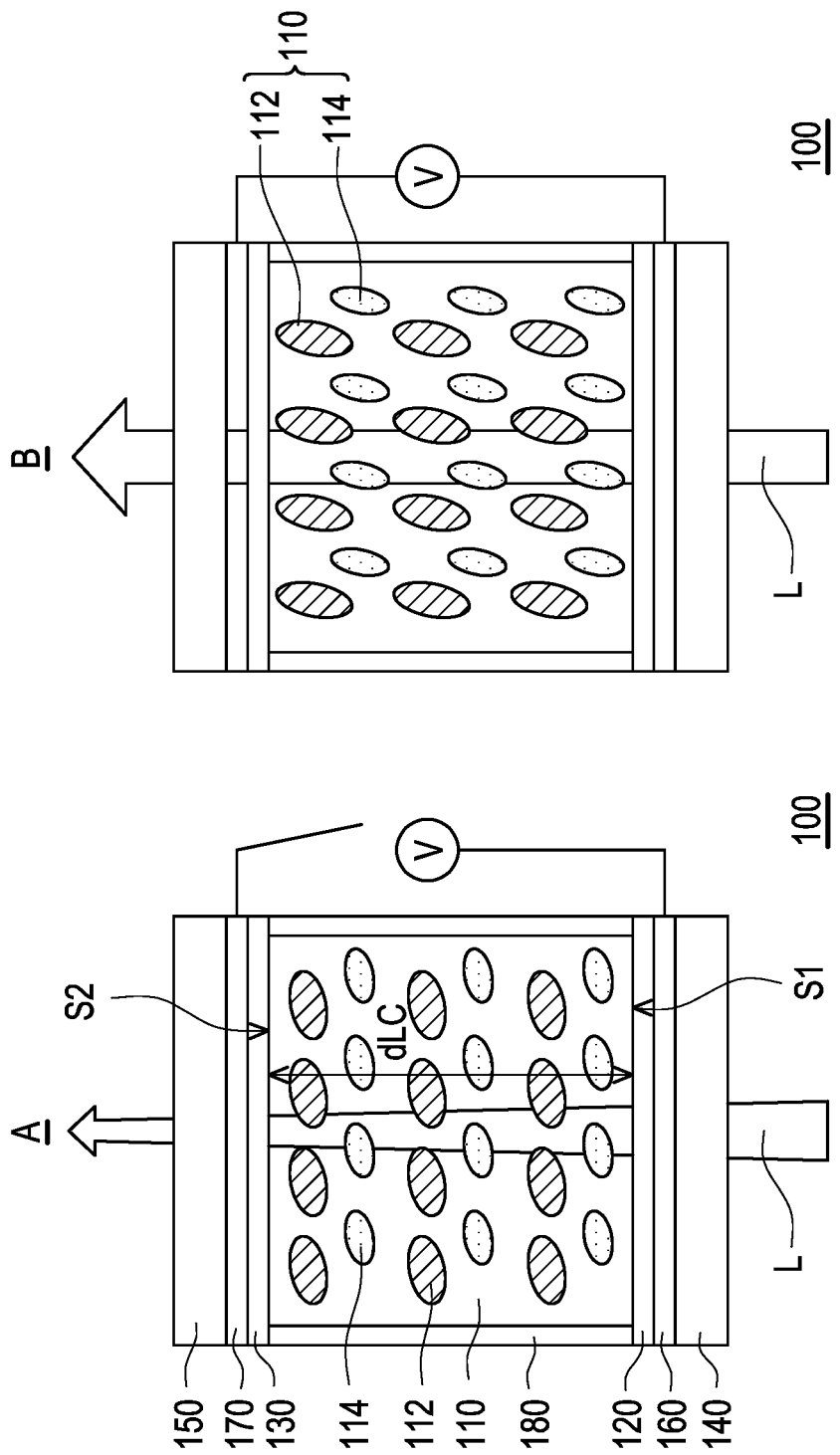
FIG. 1 is a schematic view of an electronic device according to an embodiment of the disclosure.

Certain terms may be used throughout the disclosure and the claims to refer to specific components. Those skilled in the art will understand that electronic device manufacturers may refer to the same components by different names. The disclosure does not intend to distinguish between components that have the same function but have different names. In the following description and claims, the words "comprising" and "including" are open-ended words, and thus should be interpreted as meaning "including but not limited to."

Directional terms mentioned herein, such as "up," "down," "front," "rear," "left," "right," and the like refer only to the directions of the drawings. Accordingly, the directional terms used are for illustration, and are not intended to limit the disclosure. In the drawings, each figure illustrates the general characteristics of methods, structures and/or materials used in particular embodiments. However, these drawings should not be construed to define or limit the scope or nature covered by these embodiments. For example, the relative sizes, thicknesses and positions of various layers, regions and/or structures may be reduced or enlarged for clarity.

When a structure (or layer, component, substrate) is described in the disclosure as being located on/over another structure (or layer, component, substrate), it may mean that the two structures are adjacent and directly connected, or it may mean that the two structures are adjacent but not directly connected. Not being directly connected means that there is at least one intermediate structure (or intermediate layer, intermediate component, intermediate substrate, intermediate space) between the two structures, and the lower surface of one structure is adjacent to or directly connected to the upper surface of the intermediate structure, and the upper surface of another structure is adjacent to or directly connected to the lower surface of the intermediate structure. The intermediate structure may be composed of a single-layer or multi-layer physical structure or non-physical structure, which is not limited in the disclosure. In the disclosure, when a certain structure is disposed "on" another structure, it may mean that the certain structure is "directly" on another structure, or it may mean that the certain structure is "indirectly" on another structure; that is, there is at least one structure interposed between the certain structure and another structure.

Terms such as "first," "second" and the like used in the disclosure and the claims are used to modify elements and do not imply and represent that the element(s) have any preceding ordinal numbers, nor do they represent the order of a certain element and another element, or the order of the manufacturing method; the use of these ordinal numbers is only used to clearly distinguish an element with a certain name from another element with the same name. The claims and the disclosure may not use the same terms, whereby a first element in the disclosure may be a second element in the claims.

The electrical connection or coupling described in this disclosure may refer to direct connection or indirect connection. In the case of direct connection, the terminals of components on two circuits are directly connected or connected to each other by a conductor line, and in the case of indirect connection, there are switches, diodes, capacitors, inductors, resistors, other suitable components, or a combination of the above-mentioned components between the terminals of the components on the two circuits, but the disclosure is not limited thereto.

In the disclosure, the measurement methods of thickness, length and width may be measured by using an optical microscope, and the thickness or width may be measured by a cross-sectional image in an electron microscope, but the disclosure is not limited thereto. In addition, any two values or directions used for comparison may have certain errors. Additionally, the terms "equal," "equivalent," "same," "substantially," or "generally" used in the disclosure generally mean a range within 10% of a given numerical value. Furthermore, the expressions that "a given range is from a first value to a second value" and that "a given range is within a range from the first value to the second value" means that the given range includes the first value, the second value, and other values in between. If a first direction is perpendicular to a second direction, the angle difference between the first direction and the second direction may be between 70 degrees and 110 degrees; if the first direction is parallel to the second direction, the angle difference between the first direction and the second direction may be between 0 degrees and 20 degrees.

It should be noted that, in the following embodiments, features in several different embodiments may be replaced, recombined, and mixed to complete other embodiments without departing from the spirit of the disclosure. As long as the features of the various embodiments do not depart from the spirit of the invention or conflict with each other, they may be mixed and matched as desired.

Unless otherwise specified, all terms (including technical and scientific terms) used herein have the same meaning as commonly understood by one of ordinary skill in the art to which the disclosure pertains. It is understood that these terms, such as those defined in commonly used dictionaries, should be interpreted as having meanings consistent with the relevant art and the background or context of the disclosure, and should not be interpreted in an idealized or overly formal way, unless otherwise specified in the embodiments of the disclosure. In the disclosure, the electronic device may include a display device, a backlight device, an antenna device, a sensing device or a splicing device, but the disclosure is not limited thereto. The electronic device may be a bendable or flexible electronic device. The display device may be a non-self-luminous display device or a self-luminous display device. The antenna device may be a liquid crystal antenna device or a non-liquid crystal antenna device, and the sensing device may be a sensing device for sensing capacitance, light, heat or ultrasonic waves, but the disclosure is not limited thereto. In the disclosure, electronic components may include passive components and active components, such as capacitors, resistors, inductors, diodes, transistors, and the like. The diodes may include light emitting diodes or photodiodes. The light emitting diodes may include, for example, organic light emitting diodes (OLEDs), mini LEDs, micro LEDs, or quantum dot light emitting diodes (quantum dot LEDs), but the disclosure is not limited thereto. Hereinafter, the disclosure will be described with the display device as the electronic device or the splicing device, but the disclosure is not limited thereto.

It should be noted that the technical solutions provided by the different embodiments hereinafter may be replaced, combined or used in combination, so as to form another embodiment without departing from the spirit of the disclosure.

In some embodiments of the disclosure, terms related to bonding and connection, such as "connection," "interconnection," and the like, unless otherwise specified, may mean that two structures are in direct contact, or may also mean that two structures are not in direct contact, in which there are other structures provided between these two structures. The terms related to bonding and connection may also include the case where both structures are movable, or both structures are fixed. Furthermore, the terms "electrical connection" and "coupling" include any direct and indirect method of electrical connection.

In the following embodiments, the same or similar elements will be designated by the same or similar reference numerals, and the detailed description thereof will be omitted. In addition, the features in different embodiments may be mixed and matched as desired as long as they do not depart from the spirit of the invention or conflict with each other, and simple equivalent changes and modifications made according to the disclosure or claims are still within the scope of the disclosure. In addition, terms such as "first," "second" and the like used in the disclosure or the claims are only used to name different elements or to distinguish different embodiments or ranges, rather than to limit the upper or lower limit of the number of elements, nor are they intended to limit the order of manufacture or disposition of the elements.

FIG. 1 is a schematic view of an electronic device according to an embodiment of the disclosure. FIG. 1 presents two states of an electronic device 100. As shown in FIG. 1, the electronic device 100 includes a first liquid crystal layer 110, a first alignment layer 120, a second alignment layer 130, a first substrate 140, a second substrate 150, a first electrode 160, a second electrode 170 and a sealant 180. The electronic device 100 may be a liquid crystal panel, but the disclosure is not limited thereto. Specifically, the first substrate 140 and the second substrate 150 are disposed opposite to each other, and the first liquid crystal layer 110 is sandwiched between the first substrate 140 and the second substrate 150. The first liquid crystal layer 110 has a first side S1 and a second side S2, and the first side S1 is opposite to the second side S2. The first alignment layer 120 is disposed on the first side S1 and is specifically located between the first liquid crystal layer 110 and the first substrate 140. The second alignment layer 130 is disposed on the second side S2 and is specifically located between the first liquid crystal layer 110 and the second substrate 150. The sealant 180 is disposed between the first substrate 140 and the second substrate 150 and surrounds the periphery of the first liquid crystal layer 110 to seal the first liquid crystal layer 110. The first electrode 160 is disposed on the first substrate 140 and is specifically located between the first substrate 140 and the first alignment layer 120, and the second electrode 170 is disposed on the second substrate 150 and is specifically located between the second substrate 150 and the second alignment layer 120.

The first liquid crystal layer 110 is a host-guest liquid crystal layer, and may include liquid crystal molecules 112 and dye molecules 114. The liquid crystal molecules 112 have dielectric anisotropy and may change the alignment state in response to the electric field provided by the first electrode 160 and the second electrode 170. In some embodiments, the liquid crystal molecules 112 may include polymer grid liquid crystal, polymer stabilized cholesteric liquid crystal and the like, but the disclosure is not limited thereto. For example, in the state A of FIG. 1, no electrical signal is applied to the first electrode 160 and the second electrode 170, and no electric field is generated. At this time, the liquid crystal molecules 112 exhibit an initial alignment state. In the state B of FIG. 1, an electric signal is applied to the first electrode 160 and the second electrode 170 to generate an electric field. At this time, the liquid crystal molecules 112 are aligned along the direction of the electric field, which is different from the initial state. In some embodiments, the liquid crystal molecules 112 are aligned parallel to or perpendicular to the direction of the electric field, but the disclosure is not limited thereto. In some embodiments, the first liquid crystal layer 110 further includes chiral molecules, so that the liquid crystal molecules 112 are aligned between the first substrate 140 and the second substrate 150 in a helical manner. In some embodiments, when the first liquid crystal layer 110 includes chiral molecules, the ratio of the thickness dLC to the chiral pitch of the first liquid crystal layer 110 may be less than 1. In some embodiments, the phase retardation of the first liquid crystal layer 110 is, for example, between 150 nanometers to 7500 nanometers, that is, 150 nanometers<the phase retardation of the first liquid crystal layer 110<7500 nanometers, but the disclosure is not limited thereto. In some embodiments, the first electrode 160 and the second electrode 170 may be full-surface electrodes, so a uniform electric field may be provided between the first substrate 140 and the second substrate 150 to control the alignment of the liquid crystal molecules 112. However, in some embodiments, at least one of the first electrode 160 and the second electrode 170 may be patterned to provide a localized electric field distribution.

In some embodiments, the dye molecules 114 are dichroic. The dye molecules 114 have long axes and absorb light whose polarization state is parallel to their long axes, thereby providing a light absorption effect. When the liquid crystal molecules 112 change their alignment, the dye molecules 114 may change their alignment state accordingly. For example, in the state A of FIG. 1, the long axes of the dye molecules 114 are substantially parallel to the first substrate 140 or the second substrate 150 and intersect the incident direction of the light L, so the dye molecules 114 absorb the portion of the light L whose polarization state is parallel to the long axes of the dye molecules 114. In contrast, in the state B of FIG. 1, the long axes of the dye molecules 114 are substantially perpendicular to the first substrate 140 or the second substrate 150 and parallel to the incident direction of the light L, so the dye molecules 114 do not absorb the light L significantly. Therefore, in the state A of FIG. 1, the transmittance of the light L is low, which may be understood as a dark state, and in the state B of FIG. 1, the transmittance of the light L is high, which may be understood as a bright state. Therefore, the electronic device 100 may control the molecular alignment of the first liquid crystal layer 110 to adjust the transmittance of the light L. In some embodiments, the electronic device 100 may be applied to an optical switching device, such as a dimmable car window, a dimmable window and the like, but the disclosure is not limited thereto.

The first alignment layer 120 and the second alignment layer 130 may provide an alignment function to affect the alignment of the liquid crystal molecules 112. In some embodiments, the first alignment layer 120 and the second alignment layer 130 may be provided with corresponding alignment functions through mechanical alignment such as rubbing, optical alignment and the like. For example, when the first alignment layer 120 and the second alignment layer 130 are provided with an alignment function by surface rubbing, the alignment direction provided by the first alignment layer 120 and the second alignment layer 130 may be determined by the rubbing direction. In some embodiments, the first alignment layer 120 and the second alignment layer 130 may be irradiated with a specific wavelength and a specific polarized light to be provided with an alignment function. For the first alignment layer 120 and the second alignment layer 130, an appropriate alignment method may be selected according to their material properties. In some embodiments, materials of the first alignment layer 120 and the second alignment layer 130 may include polyimide (PI), polyacrylic acid, and the like, but the disclosure is not limited thereto.

In this embodiment, the first substrate 140 and the second substrate 150 have sufficient mechanical support to maintain the thickness of the first liquid crystal layer 110. The first substrate 140 and the second substrate 150 may be rigid substrates or flexible substrates. The materials of the first substrate 140 and the second substrate 150 may include glass or plastic, but the disclosure is not limited thereto. For example, the materials of the first substrate 140 and the second substrate 150 include polyethylene terephthalate (PET), polycarbonate (PC), triacetate cellulose (TAC), polyimide, and the like.

Figure 2:
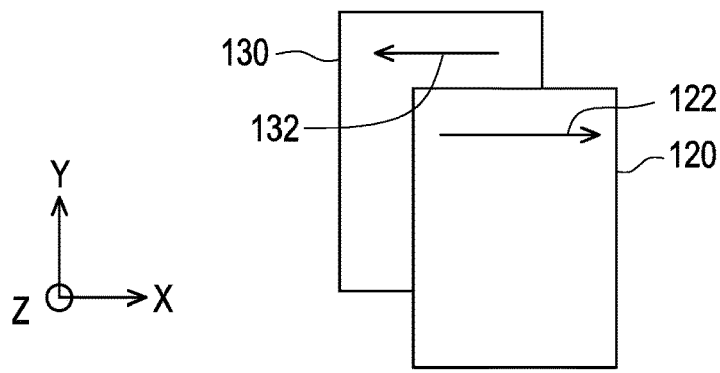
FIGS. 2 and 3 schematically show the alignment function of the first alignment layer and the second alignment layer.
Figure 3:
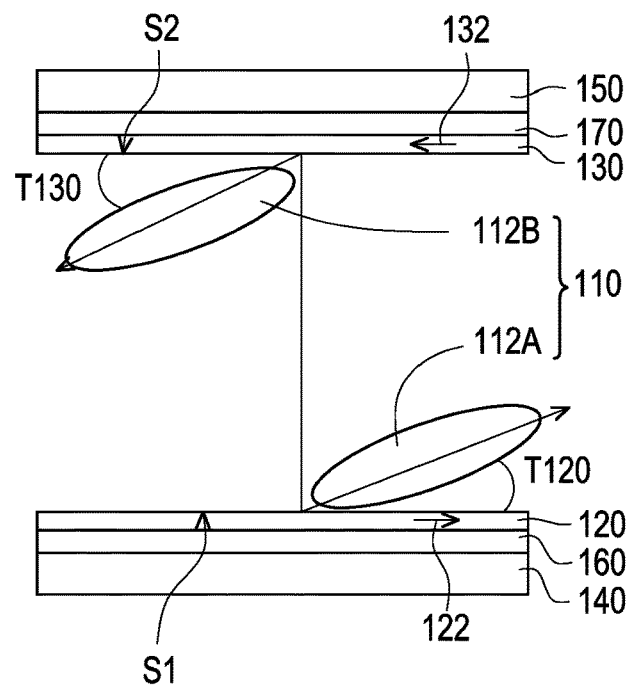

FIGS. 2 and 3 schematically show the alignment function of the first alignment layer and the second alignment layer. In some embodiments, as shown in FIGS. 2 and 3, a first alignment direction 122 provided by the first alignment layer 120 is opposite to a second alignment direction 132 provided by the second alignment layer 130. In the disclosure, that "the two alignment directions are opposite to each other" means that the azimuth angle of one alignment direction is substantially opposite to the azimuth angle of the other alignment direction, but the included angle of the azimuth angles may still vary within a range of plus or minus 20 degrees. That is, the included angle of the azimuth angles of the two alignment directions may be between 160 degrees and 200 degrees (160 degrees≤the included angle of the azimuth angles of the two alignment directions≤200 degrees). For example, if the first alignment direction 122 points to the positive X-axis direction, for example, and the second alignment direction 132 points to the negative X-axis direction, for example, then the included angle between the azimuth angle of the first alignment direction 122 and the azimuth angle of the second alignment direction 132 is 180 degrees. That is, as shown in FIG. 2, the axis of the first alignment direction 122 and the axis of the second alignment direction 132 are substantially parallel to each other and substantially parallel to the X-axis direction. Therefore, the first alignment layer 120 and the second alignment layer 130 may provide substantially coaxial alignment.

The direction of the first alignment direction 122 and the direction of the second alignment direction 132 may be described with reference to FIG. 3. FIG. 3 shows the tilted state of liquid crystal molecules 112A and 112B in the first liquid crystal layer 110 under the alignment function of the first alignment layer 120 and the second alignment layer 130. The liquid crystal molecule 112A is a molecule in the first liquid crystal layer 110 adjacent to the first alignment layer 120 (that is, located on the first side S1), which is tilted at a pretilt angle T120 under the action of the first alignment layer 120. The liquid crystal molecule 112B is a molecule in the first liquid crystal layer 110 adjacent to the second alignment layer 130 (that is, located on the second side S2), which is tilted at a pretilt angle T130 under the action of the second alignment layer 130. That is, the first liquid crystal layer 110 has opposite inclinations on the first side S1 and on the second side D2. As shown in FIG. 3, an end of the liquid crystal molecule 112A facing the positive X-axis direction is lifted away from the first alignment layer 120, while an end of the liquid crystal molecule 112A facing the negative X-axis direction is relatively close to the first alignment layer 120, which may be understood as the first alignment direction 122 of the first alignment layer 120 pointing to the positive X-axis direction. Similarly, an end of the liquid crystal molecule 112B facing the negative X-axis direction is lifted away from the second alignment layer 130, while an end of the liquid crystal molecule 112B facing the positive X-axis direction is relatively close to the second alignment layer 130, which may be understood as the second alignment direction 132 of the second alignment layer 130 pointing to the negative X-axis direction. In some embodiments, when the liquid crystal molecules 112, 112A and 112B of the first liquid crystal layer 110 are positive liquid crystal molecules, the pretilt angle T120 and the pretilt angle T130 may be 0 degrees to 20 degrees, for example, 0°<(the pretilt angle T120 or the pretilt angle T130)<20°. When the liquid crystal molecules 112, 112A and 112B of the first liquid crystal layer 110 are negative liquid crystal molecules, the pretilt angle T120 and the pretilt angle T130 may be 70 degrees to 90 degrees, for example, 70°<(the pretilt angle T120 or the pretilt angle T130)<90°. It may be seen from FIG. 2 and FIG. 3 that the axes of the first alignment direction 122 and the second alignment direction 132 are substantially parallel, but point to opposite directions.

Figure 4:
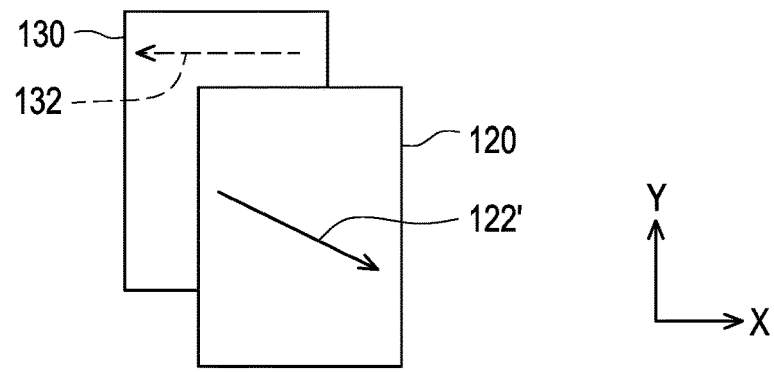
FIG. 4 is a schematic view showing alignment directions of the first alignment layer and the second alignment layer according to an embodiment.

In some embodiments, the axes of the first alignment direction 122 and the second alignment direction 132 are not limited to being completely parallel. For example, FIG. 4 is a schematic view showing alignment directions of the first alignment layer and the second alignment layer according to an embodiment. In FIG. 4, the first alignment direction 122' of the first alignment layer 120 and the second alignment direction 132 of the second alignment layer 130 have opposite directions; that is, the first alignment direction 122' and the second alignment direction 132 may respectively cause the first liquid crystal layer 110 to have the pretilt angle T120 and the pretilt angle T130 as shown in FIG. 3. However, the axis of the first alignment direction 122' is not completely parallel to the axis of the second alignment direction 132. For example, the azimuth angle of the first alignment direction 122' and the azimuth angle of the second alignment direction 132 intersect by 180±n degrees, and n ranges from 0 to 20; that is, the included angle between the azimuth angle of the first alignment direction 122' and azimuth angle of the second alignment direction 132 is between 160 degrees and 200 degrees (160 degrees≤the included angle between the azimuth angle of the first alignment direction and the azimuth angle of the second alignment direction≤200 degrees).

In some embodiments, the angle is measured in a clockwise direction. For example, when n is +20, the second alignment direction 132 may be a direction rotated 200 degrees clockwise from the first alignment direction 122', and when n is −20, the second alignment direction 132 may be a direction rotated 160 degrees clockwise from the first alignment direction 122'. In other embodiments, the angle is measured in a counterclockwise direction; when n is +20, the second alignment direction 132 may be a direction rotated 200 degrees counterclockwise from the first alignment direction 122', and when n is −20, the second alignment direction 132 may be a direction rotated 160 degrees counterclockwise from the first alignment direction 122'. In some embodiments, the azimuth angle of the first alignment direction 122' intersects with the azimuth angle of the second alignment direction 132 by 180±n degrees, and n is greater than or equal to 0 and less than 5, which may achieve a lower transmittance. That is, in order to achieve a better dark state effect, the included angle between the azimuth angle of the first alignment direction and the azimuth angle of the second alignment direction may be between 175 degrees and 185 degrees (175 degrees≤the included angle between the azimuth angle of the first alignment direction and the azimuth angle of the second alignment direction≤185 degrees).

Figure 5:
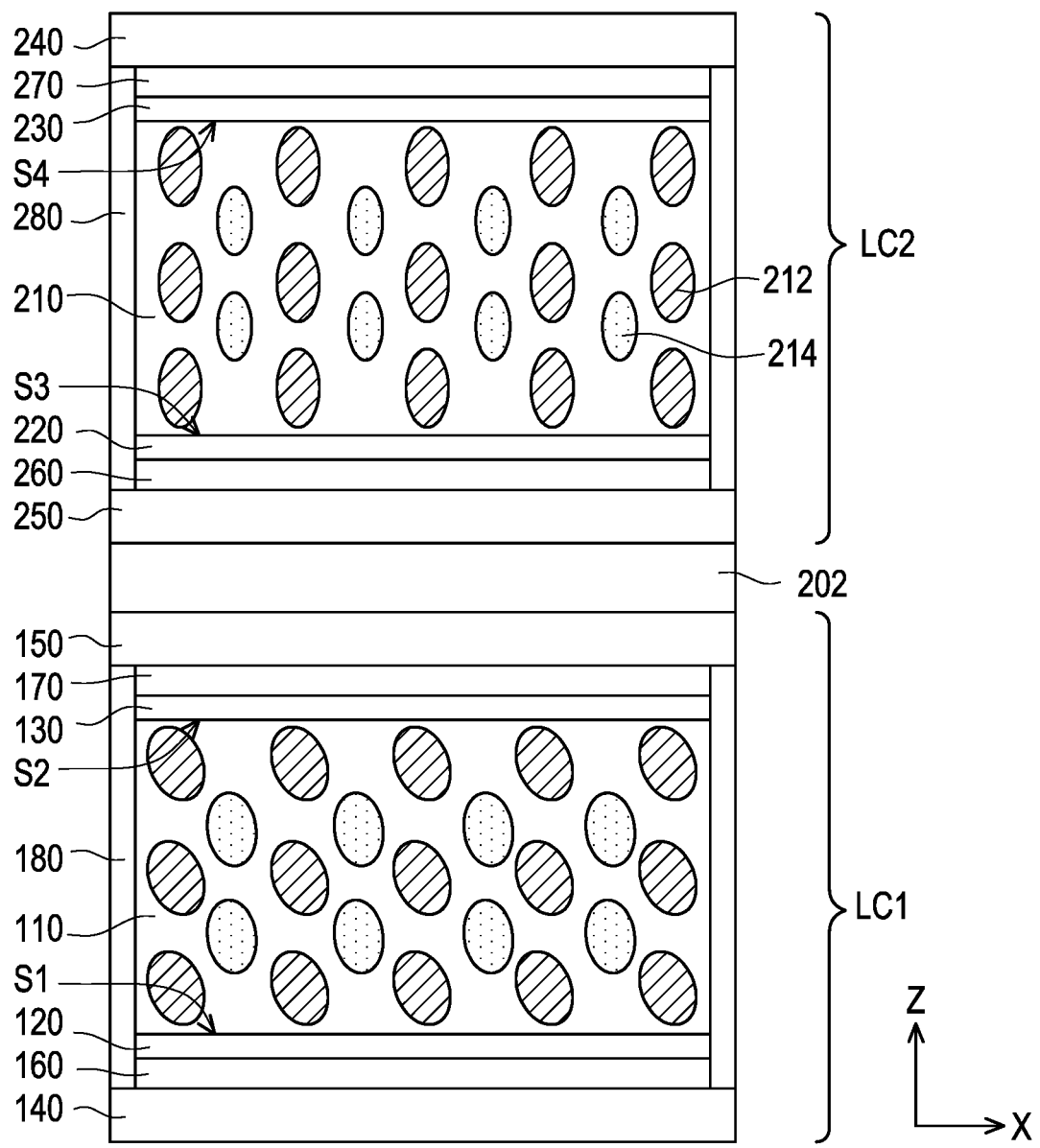
FIG. 5 is a schematic cross-sectional view of an electronic device according to an embodiment of the disclosure.

FIG. 5 is a schematic cross-sectional view of an electronic device according to an embodiment of the disclosure. The electronic device 200 includes the components disclosed in FIG. 1: a first liquid crystal layer 110, a first alignment layer 120, a second alignment layer 130, a first substrate 140, a second substrate 150, a first electrode 160, a second electrode 170 and a sealant 180. In addition, the electronic device 200 further includes a second liquid crystal layer 210, a third alignment layer 220, a fourth alignment layer 230, a third substrate 240, a fourth substrate 250, a third electrode 260, a fourth electrode 270 and a sealant 280. The first liquid crystal layer 110, the first alignment layer 120, the second alignment layer 130, the first substrate 140, the second substrate 150, the first electrode 160, the second electrode 170, and the sealant 180 may form a first liquid crystal panel LC1; and the second liquid crystal layer 210, the third alignment layer 220, the fourth alignment layer 230, the third substrate 240, the fourth substrate 250, the third electrode 260, the fourth electrode 270 and the sealant 280 may form a second liquid crystal panel LC2. The electronic device 200 may further include a dielectric layer 202 disposed between the first liquid crystal panel LC1 and the second liquid crystal panel LC2. The dielectric layer 202 may be solid, liquid, gaseous or vacuum; the solid dielectric layer may include an adhesive layer such as optical glue or tape; the liquid dielectric layer 202 may include water; and the gaseous dielectric layer 202 may include nitrogen, oxygen, air, and the like, but the disclosure is not limited thereto.

For the configuration relationship, specific materials and structures of the components in the first liquid crystal panel LC1, reference may be made to the description of the embodiment in FIG. 1. The design of each component in the second liquid crystal panel LC2 is also similar to that of the first liquid crystal panel LC1. For example, the second liquid crystal layer 210, the third alignment layer 220, the fourth alignment layer 230, the third substrate 240, the fourth substrate 250, the third electrode 260, the fourth electrode 270, and the sealant 280 may respectively correspond to the first liquid crystal layer 110, the first alignment layer 120, the second alignment layer 130, the first substrate 140, the second substrate 150, the first electrode 160, the second electrode 170, and the sealant 180 of FIG. 1. Therefore, the descriptions of FIGS. 1 to 4 may apply to the second liquid crystal panel LC2.

In brief, the second liquid crystal layer 210 is disposed on the first liquid crystal layer 110 and has a third side S3 and a fourth side S4. The third alignment layer 220 is disposed on the third side S3, and the fourth alignment layer 230 is disposed on the fourth side S4. In this embodiment, the second alignment layer 130 is located between the first liquid crystal layer 110 and the third alignment layer 220, and the third alignment layer 220 is located between the second liquid crystal layer 210 and the second alignment layer 130. That is, the second alignment layer 130 of the first liquid crystal panel LC1 is disposed adjacent to the third alignment layer 220 of the second liquid crystal panel LC2. In addition, the second liquid crystal layer 210, the third alignment layer 220 and the fourth alignment layer 230 are disposed between the fourth substrate 250 and the third substrate 240. The third alignment layer 220 is located between the fourth substrate 250 and the second liquid crystal layer 210, and the fourth alignment layer 230 is located between the third substrate 240 and the second liquid crystal layer 210. In this embodiment, the dielectric layer 202 is located between the second substrate 150 and the fourth substrate 250.

In some embodiments, the first liquid crystal panel LC1 may adopt a drop injection method or other alternative methods (for example, vacuum injection or other methods) to form the first liquid crystal layer 110 between the first substrate 140 and the second substrate 150 between. A spacer (not shown) may be provided between the first substrate 140 and the second substrate 150 to maintain the thickness of the first liquid crystal layer 110 and provide proper support. The second liquid crystal panel LC2 may also form the second liquid crystal layer 110 between the third substrate 240 and the fourth substrate 250 in a similar way. After the first liquid crystal panel LC1 and the second liquid crystal panel LC2 are respectively fabricated, they may be bonded together through the dielectric layer 202, or combined together through other alternative ways without the dielectric layer 202.

Figure 6:
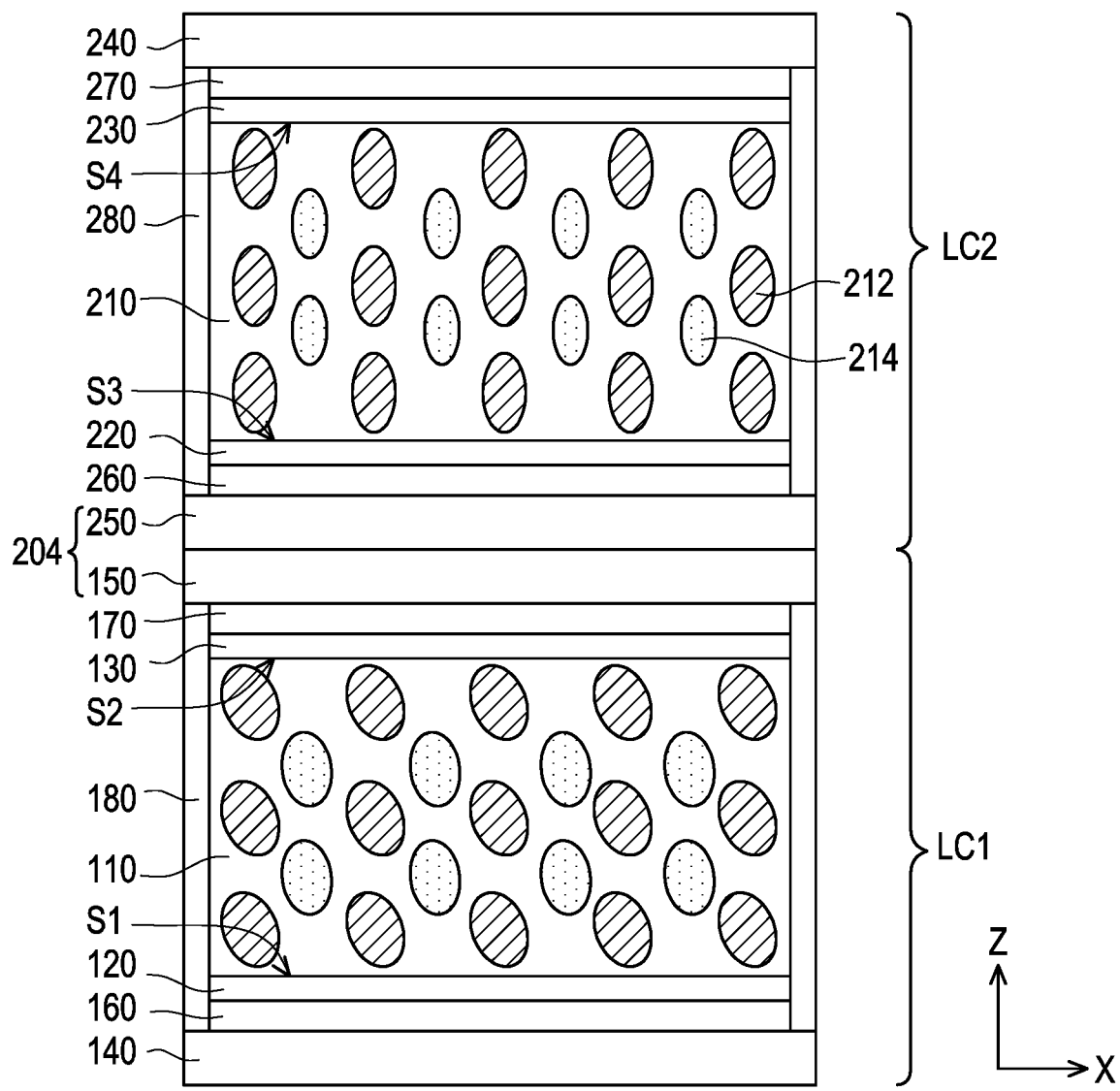
FIG. 6 is a schematic cross-sectional view of an electronic device according to an embodiment of the disclosure.

For example, FIG. 6 is a schematic cross-sectional view of an electronic device according to an embodiment of the disclosure. The electronic device 200' of FIG. 6 includes the first liquid crystal panel LC1 and the second liquid crystal panel LC2 described in FIG. 5, and the first liquid crystal panel LC1 and the second liquid crystal panel LC2 are in direct contact with each other, so the electronic device 200' does not include the dielectric layer 202 in FIG. 5. Specifically, at least one of the second substrate 150 and the fourth substrate 250 has, for example, a thermocompressible property. After the first liquid crystal panel LC1 and the second liquid crystal panel LC2 are respectively fabricated, the second substrate 150 of the first liquid crystal panel LC1 and the fourth substrate 250 of the second liquid crystal panel LC3 may be pressed into a composite substrate 204 by thermal compression bonding. In other words, the electronic device 200' may include three substrates: the first substrate 140, the third substrate 240 and the composite substrate 204, and the composite substrate 204 is formed by compressing the second substrate 150 and the fourth substrate 250. In some embodiments, the composite substrate 204 may be replaced by a single layer substrate. That is, the composite substrate 204 of FIG. 6 is replaced with a single substrate (for example, the second substrate 150 of FIG. 1). For example, after the first liquid crystal panel LC1 is fabricated, the second liquid crystal layer 210 may be formed on the second substrate 150 and the third substrate 240 may be provided to dispose the second liquid crystal layer 210 between the second substrate 150 and the third substrate 240. In this way, the electronic device 200' may omit the fourth substrate 250, and the first liquid crystal layer 110 and the second liquid crystal layer 210 may share the second substrate 150 to provide support. In the electronic device 200' in which the composite substrate 204 is replaced by the second substrate 150, the first liquid crystal layer 110, the first alignment layer 120 and the second alignment layer 130 are disposed between the first substrate 140 and the second substrate 150; and the second liquid crystal layer 210, the third alignment layer 220 and the fourth alignment layer 230 are disposed between the third substrate 240 and the second substrate 150; the second alignment layer 130 is located between the first liquid crystal layer 110 and the third alignment layer 220, and the third alignment layer 220 is located between the second liquid crystal layer 210 and the second alignment layer 130.

Since FIG. 5 is substantially similar to FIG. 6, the following description will continue with reference to FIG. 5. The following description is applicable to the embodiment of FIG. 6. In FIG. 5, the first liquid crystal layer 110 and the second liquid crystal layer 120 may both be host-guest liquid crystal layers. For example, the first liquid crystal layer 110 may include liquid crystal molecules 112 and dye molecules 114, and the second liquid crystal layer 210 may include liquid crystal molecules 212 and dye molecules 214. In some embodiments, the first liquid crystal layer 110 and the second liquid crystal layer 210 may further include chiral molecules, so that the liquid crystal molecules 112 are aligned between the first substrate 140 and the second substrate 150 in a helical manner, and the liquid crystal molecules 212 are aligned between the third substrate 240 and the fourth substrate 250 in a helical manner. In some embodiments, when the first liquid crystal layer 110 and the second liquid crystal layer 210 include chiral molecules, the ratio of the thickness to the chiral pitch of the first liquid crystal layer 110 and the second liquid crystal layer 210 may be less than 1.

In some embodiments, the dye molecules 114 and 214 are dichroic. The dye molecules 114 and 214 absorb light whose polarization state is parallel to their long axes, thereby providing a light absorption effect. The alignment of the dye molecules 114 and 214 may be controlled by the liquid crystal molecules 112 and 212. In addition, the electric field formed by the first electrode 160 and the second electrode 170 may control the alignment of the liquid crystal molecules 112, and the electric field formed by the third electrode 260 and the fourth electrode 270 may control the alignment of the liquid crystal molecules 212. Therefore, the electronic device 200 may achieve the required light transmission effect through the electric field formed by the first electrode 160 and the second electrode 170 and the electric field formed by the third electrode 260 and the fourth electrode 270.

For example, when the first electrode 160 and the second electrode 170 are not applied with a voltage, the liquid crystal molecules 112 exhibit the initial alignment of the state A in FIG. 1. At this time, the long axes of the dye molecules 114 in the first liquid crystal panel LC1 may be substantially parallel to the first substrate 140 or the second substrate 150, so the dye molecules 114 absorb light passing through the first liquid crystal panel LC1. In another state, the electric field formed by the first electrode 160 and the second electrode 170 controls the liquid crystal molecules 112 to be aligned substantially along the Z-axis direction. At this time, the long axes of the dye molecules 114 in the first liquid crystal panel LC1 may also be substantially parallel to the Z-axis direction without significant light absorption.

That is, when the first electrode 160 and the second electrode 170 form an electric field, the first liquid crystal panel LC1 is, for example, in the state B in FIG. 1, allowing most of the light to pass through.

Similarly, the second liquid crystal layer 210 of the second liquid crystal panel LC2 may be in state A as shown in FIG. 1 when the third electrode 260 and the fourth electrode 270 are not applied with a voltage. That is, the liquid crystal molecules 212 in the second liquid crystal layer 210 exhibit the initial alignment, and the dye molecules 114 are aligned substantially parallel to the third substrate 240 or the fourth substrate 250 to absorb light passing through the first liquid crystal panel LC1. When the third electrode 260 and the fourth electrode 270 form an electric field in the second liquid crystal panel LC2, the liquid crystal molecules 212 in the second liquid crystal layer 210 are aligned substantially along the Z-axis direction. At this time, the long axes of the dye molecules 214 in the second liquid crystal panel LC2 may also be substantially parallel to the Z-axis direction to allow light to pass through. Therefore, the electronic device 200 may achieve different light transmittances. For example, when low transmittance is required, both the first liquid crystal panel LC1 and the second liquid crystal panel LC2 may be maintained in the state A of FIG. 1, and when high transmittance is required, both the first liquid crystal panel LC1 and the second liquid crystal panel LC2 may be maintained in the state B of FIG. 1. In addition, when intermediate transmittance is required, one of the first liquid crystal panel LC1 and the second liquid crystal panel LC2 may be maintained in the state A of FIG. 1, and the other may be maintained in the state B of FIG. 1.

Figure 7:
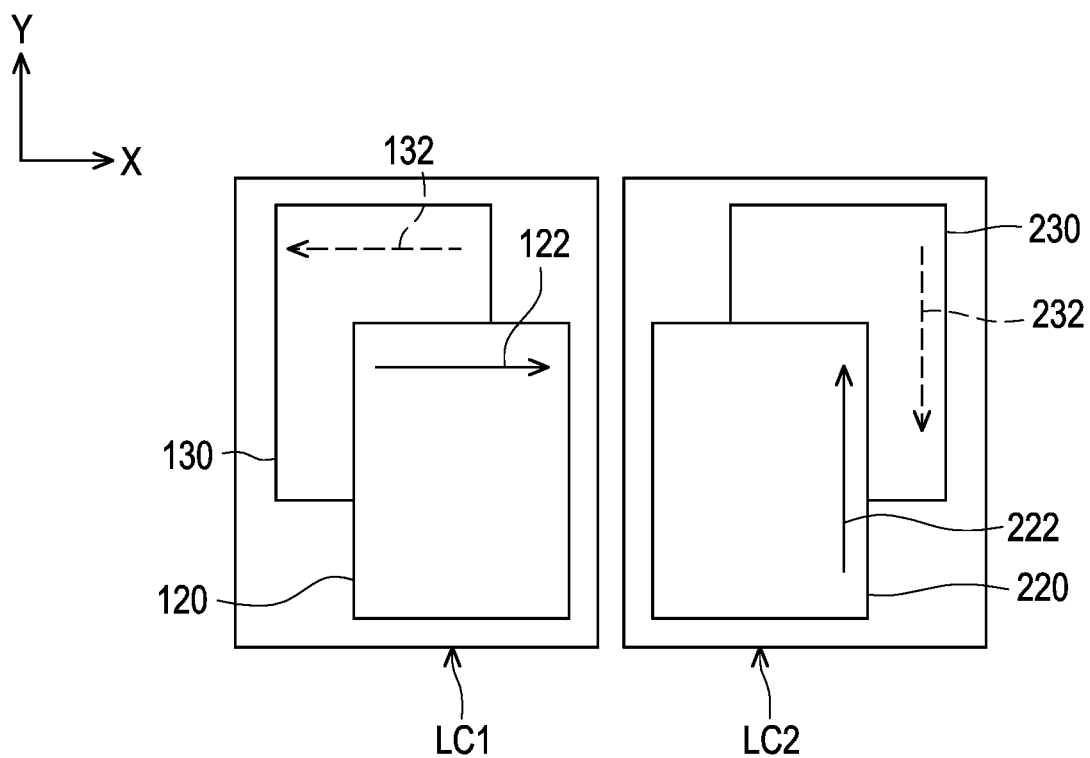
FIG. 7 is a schematic view of the alignment directions of the alignment layers in an electronic device according to an embodiment.

FIG. 7 is a schematic view of the alignment directions of the alignment layers in an electronic device according to an embodiment. In FIG. 7, the first alignment direction 122 provided by the first alignment layer 120 is opposite to the second alignment direction 132 provided by the second alignment layer 130, and the third alignment direction 222 provided by the third alignment layer 220 is opposite to the fourth alignment direction 232 provided by the fourth alignment layer 230. For example, the first alignment direction 122 points to the positive X-axis direction, for example, and the second alignment direction 132 points to the negative X-axis direction, for example. Meanwhile, the third alignment direction 222 points to the positive Y-axis direction, for example, and the fourth alignment direction 232 points to the negative Y-axis direction, for example. Specifically, the axis of the first alignment direction 122 and the axis of the second alignment direction 132 are substantially parallel to each other and substantially parallel to the X-axis direction, and the axis of the third alignment direction 222 and the axis of the fourth alignment direction 232 are substantially parallel to each other and substantially parallel to the Y-axis direction, but the disclosure is not limited thereto.

Please refer to FIG. 5 and FIG. 7 at the same time. The first alignment layer 120 and the second alignment layer 130 may make the first liquid crystal layer 110 have the pretilt angle alignment as shown in FIG. 3, and the third alignment layer 220 and the fourth alignment layer 230 may also make the second liquid crystal layer 210 have the pretilt angle alignment as shown in FIG. 3. That is, the second liquid crystal layer 210 has opposite inclinations on the third side S3 and the fourth side S4. For example, the third alignment layer 220 may make the liquid crystal molecules 212 of the second liquid crystal layer 210 have the tilted state of the liquid crystal molecule 112A in FIG. 3 on the third side S3, and the fourth alignment layer 230 may make the liquid crystal molecules 212 of the second liquid crystal layer 210 have the tilted state of the liquid crystal molecule 112B in FIG. 3 on the fourth side S4, but the disclosure is not limited thereto. In addition, reference may be made to the related descriptions of the first alignment layer 120 and the second alignment layer 130 for the method of providing the alignment function to the third alignment layer 220 and the fourth alignment layer 230.

As shown in FIG. 7, the first alignment layer 120 and the second alignment layer 130 provide coaxial alignment, and the third alignment layer 220 and the fourth alignment layer 230 provide coaxial alignment. Meanwhile, the alignment axis provided by the first alignment layer 120 and the second alignment layer 130 in the first liquid crystal panel LC1 is substantially perpendicular to the alignment axis provided by the third alignment layer 220 and the fourth alignment layer 230 in the second liquid crystal panel LC2. In this way, when both the first liquid crystal panel LC1 and the second liquid crystal panel LC2 are in the state A of FIG. 1, the electronic device 200 may absorb most of the incident light and present a better dark state. For example, in some embodiments, when both the first liquid crystal panel LC1 and the second liquid crystal panel LC2 are maintained in the state A of FIG. 1 and the alignment axes of the first liquid crystal panel LC1 and the second liquid crystal panel LC2 are substantially perpendicular to each other, the light transmittance of the electronic device 200 may be lower than 0.1% and, for example, may be 0.05% or 0.02%, but the disclosure is not limited thereto.

Generally speaking, the thinner the thickness of the liquid crystal layer, the higher the light transmittance in both the state A and the state B of FIG. 1 in comparison with the design of a thick liquid crystal layer, which may make the light transmittance not low enough to meet the application requirements. However, the electronic device 200 has two liquid crystal layers, namely the first liquid crystal layer 110 and the second liquid crystal layer 210. Therefore, even if the thickness of the first liquid crystal layer 110 and the second liquid crystal layer 210 is relatively thin, the electronic device 200 may achieve a sufficiently low light transmittance. In addition, the alignment axis provided by the first alignment layer 120 and the second alignment layer 130 in the first liquid crystal panel LC1 is substantially perpendicular to the alignment axis provided by the third alignment layer 220 and the fourth alignment layer 230 in the second liquid crystal panel LC2. This helps to allow the second liquid crystal layer 210 to absorb light not absorbed by the first liquid crystal layer 110 or to allow the first liquid crystal layer 110 to absorb light not absorbed by the second liquid crystal layer 210, so as to achieve a sufficiently low light transmittance to meet the application requirements. In some embodiments, the thickness of the first liquid crystal layer 110 and the second liquid crystal layer 210 may be less than 10 microns, but the disclosure is not limited thereto.

Figure 8:
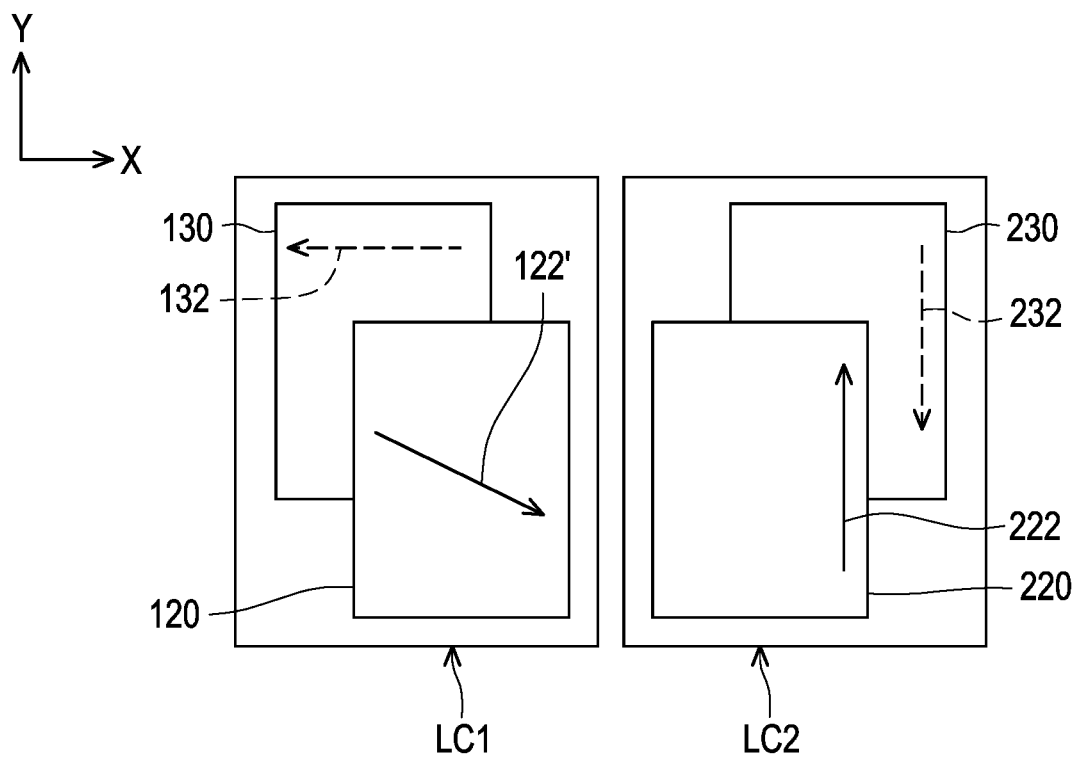
FIGS. 8 and 9 are schematic views of the alignment directions of the alignment layers in an electronic device according to different embodiments.
Figure 9:
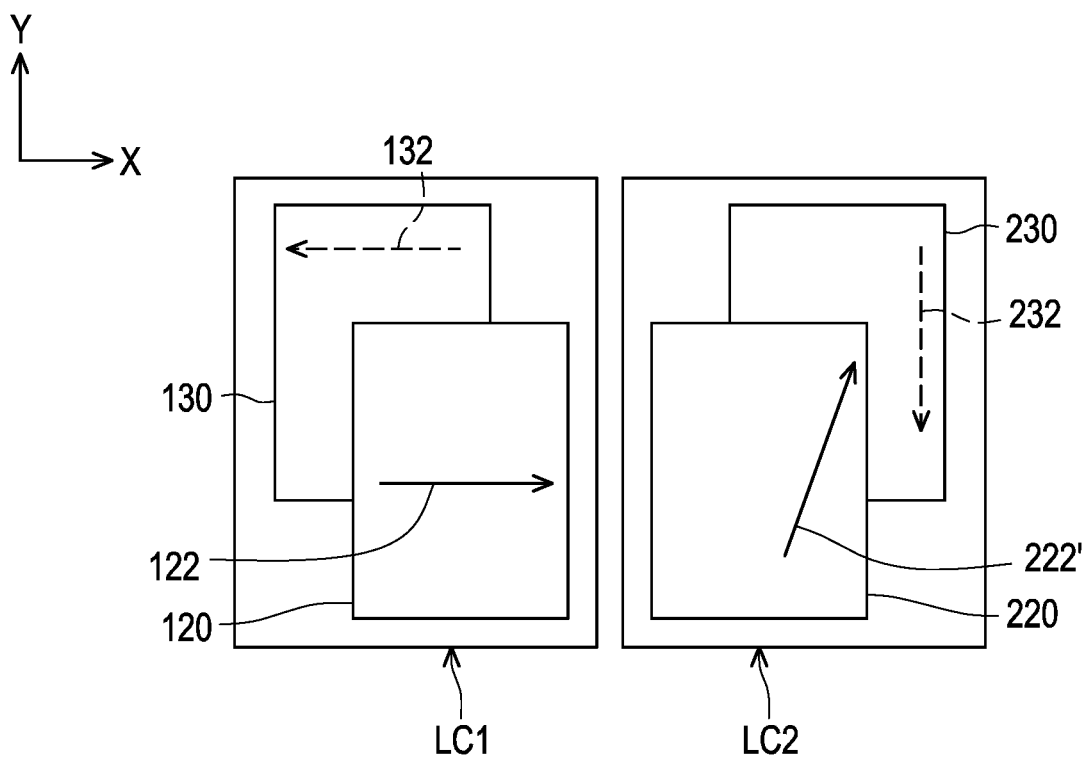

FIGS. 8 and 9 are schematic views of the alignment directions of the alignment layers in an electronic device according to different embodiments. The alignment directions shown in FIGS. 8 and 9 are substantially the same as the alignment directions shown in FIG. 7. In FIG. 8, the second alignment direction 132, the third alignment direction 222 and the fourth alignment direction 232 are substantially the same as those in FIG. 7, and therefore will not be repeated. Specifically, the first alignment direction 122' provided by the first alignment layer 120 is opposite to the second alignment direction 132 provided by the second alignment layer 130, and the third alignment direction 222 provided by the third alignment layer 220 is opposite to the fourth alignment direction 232 provided by the fourth alignment layer 230. However, the axis of the first alignment direction 122' is not completely parallel to the axis of the second alignment direction 132. For example, the azimuth angle of the first alignment direction 122' intersects with the azimuth angle of the second alignment direction 132 by 180±n degrees, and n ranges from 0 to 20. As described above, a better dark state effect may be achieved when the range of n is narrowed to from 0 to 5. For the azimuth angle relationship between the first alignment direction 122' and the second alignment direction 132, reference may be made to the related description of FIG. 4.

In addition, as shown in FIG. 9, the axes of the third alignment direction 222' and the fourth alignment direction 232 do not have to be completely parallel. That is, the azimuth angle of the third alignment direction 222' and the azimuth angle of the fourth alignment direction 232 may intersect by 180±n degrees, and n ranges from 0 to 20. As described above, a better dark state effect may be achieved when the range of n is narrowed to from 0 to 5. More specifically, when the electronic device 200 is to have a dark state transmittance of less than 5%, the included angle between the azimuth angle of the first alignment direction 122' and the azimuth angle of the second alignment direction 132 has to be between 175 degrees and 185 degrees (175 degrees≤the included angle between the azimuth angle of the first alignment direction and the azimuth angle of the second alignment direction≤185 degrees), and/or the included angle between the azimuth angle of the third alignment direction 222' and the azimuth angle of the fourth alignment direction 232 has to be between 175 degrees and 185 degrees (175 degrees≤the included angle between the azimuth angle of the third alignment direction and the azimuth angle of the fourth alignment direction≤185 degrees). If the included angle between the azimuth angle of the first alignment direction 122' and the azimuth angle of the second alignment direction 132 is between 160 degrees and 200 degrees (160 degrees≤the included angle between the azimuth angle of the first alignment direction and the azimuth angle of the second alignment direction≤200 degrees), and/or the included angle between the azimuth angle of the third alignment direction 222' and the azimuth angle of the fourth alignment direction 232 is also between 160 degrees and 200 degrees (160 degrees≤the included angle between the azimuth angle of the third alignment direction and the azimuth angle of the fourth alignment direction≤200 degrees), the dark state transmittance is between 0 to 15% (0%≤dark state transmittance≤15%).

Figure 10:
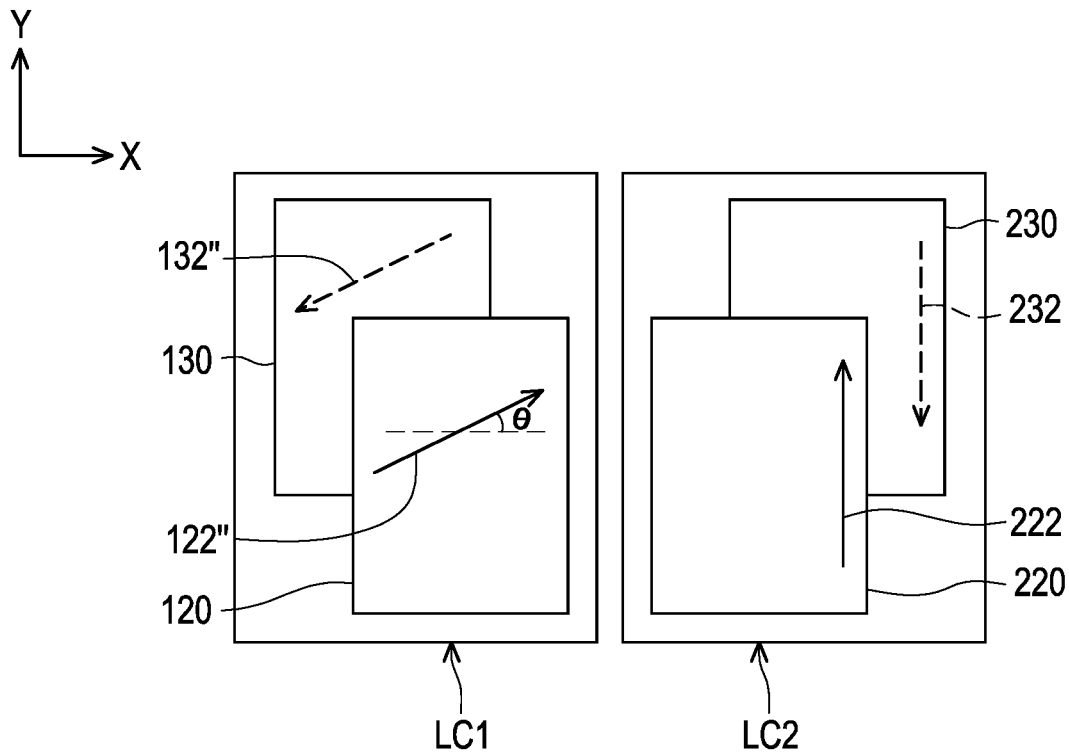
FIG. 10 is a schematic view of alignment directions of alignment layers in an electronic device according to another embodiment.

FIG. 10 is a schematic view of alignment directions of alignment layers in an electronic device according to another embodiment. The alignment directions shown in FIG. 10 are partially similar to the alignment directions shown in FIG. 7. In FIG. 10, the third alignment direction 222 and the fourth alignment direction 232 are substantially the same as those in FIG. 7, and therefore will not be repeated. Specifically, in FIG. 10, the first alignment direction 122" provided by the first alignment layer 120 is opposite to the second alignment direction 132" provided by the second alignment layer 130, and the third alignment direction 222 provided by the third alignment layer 220 is opposite to the fourth alignment direction 232 provided by the fourth alignment layer 230. The axis of the first alignment direction 122" and the axis of the second alignment direction 132" are substantially parallel to each other and substantially intersect the X axis at an angle θ, and the axis of the third alignment direction 222 and the axis of the fourth alignment direction 232 are substantially parallel to each other and substantially parallel to the Y-axis direction. In this way, the alignment direction provided by the first alignment layer 120 and the second alignment layer 130 in the first liquid crystal panel LC1 and the alignment direction provided by the third alignment layer 220 and the fourth alignment layer 230 in the second liquid crystal panel LC2 intersect with each other but are not perpendicular to each other. Since the second alignment layer 130 and the third alignment layer 220 are disposed adjacent to each other, in this embodiment, for example, the alignment directions of the second alignment layer 130 and the third alignment layer 220 are used to describe the intersection of the alignment directions, but the disclosure is not limited thereto. For example, the azimuth angle of the second alignment direction 132" may intersect with the azimuth angle of the third alignment direction 222 by 90±m degrees, and m ranges from 0 to 20. That is, the included angle between the azimuth angle of the second alignment direction 132" and the azimuth angle of the third alignment direction 222 is between 70 degrees and 110 degrees (70 degrees≤the included angle between the azimuth angle of the second alignment direction and the azimuth angle of the third alignment direction≤110 degrees). In some embodiments, the azimuth angle of the third alignment direction 222 may be an azimuth angle rotated clockwise or counterclockwise by 90±m degrees from the azimuth angle of the second alignment direction 132".

The alignment function illustrated in FIGS. 7 to 10 and the alignment function illustrated in FIGS. 2 to 4 may be applied in combination with each other. In some embodiments, the first alignment direction 122" and the second alignment direction 132" may have the intersecting relationship between the first alignment direction 122' and the second alignment direction 132 as shown in FIG. 8. In some embodiments, the third alignment direction 222 and the fourth alignment direction 232 may have the intersecting relationship between the third alignment direction 222' and the fourth alignment direction 232 as shown in FIG. 9. However, the first alignment direction 122" and the second alignment direction 132" make the first liquid crystal layer 110 have opposite tilting states on the first side S1 and the second side S2, and the third alignment direction 222 and the fourth alignment direction make the second liquid crystal layer 210 have opposite tilting states on the third side S3 and the fourth side S4.

To sum up, the electronic device of the embodiments of the disclosure has two liquid crystal layers, that is, the first liquid crystal layer and the second liquid crystal layer, and both liquid crystal layers include molecules that may absorb light, such as dye molecules. Two sides of the first liquid crystal layer have opposite alignment directions, and two sides of the second liquid crystal layer have opposite alignment directions. Meanwhile, the alignment axis of the first liquid crystal layer intersects with the alignment axis of the second liquid crystal layer, or is substantially perpendicular to each other. Therefore, the electronic device may achieve different light transmission effects by providing modulation of the light transmittance by the two liquid crystal layers. In some embodiments, the electronic device may be adjusted to have low light transmittance to meet different application requirements.

In the end, it should be noted that the above embodiments are only used to describe the technical solutions of the disclosure rather than to limit the disclosure. Although the disclosure has been described in detail with reference to the foregoing embodiments, those skilled in the art should understand that modifications to the technical solutions described in the foregoing embodiments may be made, or some or all of the technical features therein may be replaced with equivalents; however, such modifications or replacements do not cause the spirit of the corresponding technical solutions to depart from the scope of the technical solutions of the embodiments of the disclosure.

What is claimed is:

1. An electronic device, comprising:
    a first liquid crystal layer having a first side and a second side, wherein the first side is opposite to the second side;
    a second liquid crystal layer disposed on the first liquid crystal layer and having a third side and a fourth side, wherein the third side is opposite to the fourth side;
    a first alignment layer disposed on the first side and having a first alignment direction;
    a second alignment layer disposed on the second side and having a second alignment direction, wherein the first alignment direction is opposite to the second alignment direction;
    a third alignment layer disposed on the third side and having a third alignment direction; and
    a fourth alignment layer disposed on the fourth side and having a fourth alignment direction, wherein the third alignment direction is opposite to the fourth alignment direction,
    wherein the second alignment layer is located between the first liquid crystal layer and the third alignment layer, and the third alignment layer is located between the second liquid crystal layer and the second alignment layer, and
    wherein an azimuth angle of the second alignment direction intersects with an azimuth angle of the third alignment direction by 90±m degrees, and m is greater than 0 and less than or equal to 20.

2. The electronic device according to claim 1, further comprising:
    a first substrate;
    a second substrate; and
    a third substrate,
    wherein the first liquid crystal layer, the first alignment layer and the second alignment layer are disposed between the first substrate and the second substrate, and
    the second liquid crystal layer, the third alignment layer and the fourth alignment layer are disposed between the third substrate and the second substrate.

3. The electronic device according to claim 2, further comprising:
    a fourth substrate,
    wherein the second liquid crystal layer, the third alignment layer and the fourth alignment layer are disposed between the third substrate and the fourth substrate.

4. The electronic device according to claim 3, further comprising:
    a dielectric layer disposed between the third substrate and the fourth substrate.

5. The electronic device according to claim 4, wherein the dielectric layer is solid, liquid, gaseous or vacuum.

6. The electronic device according to claim 3, wherein the fourth substrate and the third substrate are compressed together.

7. The electronic device according to claim 1, wherein at least one of the first liquid crystal layer and the second liquid crystal layer comprises a liquid crystal molecule and a dye molecule.

8. The electronic device according to claim 7, wherein the at least one of the first liquid crystal layer and the second liquid crystal layer further comprises a chiral molecule, and a ratio of a thickness to a chiral pitch of the at least one of the first liquid crystal layer and the second liquid crystal layer is less than 1.

9. The electronic device according to claim 7, wherein the dye molecule is dichroic.

10. The electronic device according to claim 7, wherein the liquid crystal molecule comprises a polymer grid liquid crystal or a polymer stabilized cholesteric liquid crystal.

11. The electronic device according to claim 1, wherein an azimuth angle of the first alignment direction intersects with the azimuth angle of the second alignment direction by 180±n degrees, and n ranges from 0 to 20.

12. The electronic device according to claim 1, wherein the azimuth angle of the third alignment direction intersects with an azimuth angle of the fourth alignment direction by 180±n degrees, and n ranges from 0 to 20.

13. The electronic device according to claim 1, wherein the first liquid crystal layer has opposite inclinations on the first side and on the second side.

14. The electronic device according to claim 1, wherein the second liquid crystal layer has opposite inclinations on the third side and on the fourth side.

15. The electronic device according to claim 1, further comprising:
    a first electrode; and
    a second electrode,
    wherein the first alignment layer is disposed between the first electrode and the first liquid crystal layer, and
    the second alignment layer is disposed between the second electrode and the first liquid crystal layer.

16. The electronic device according to claim 1, further comprising:
    a third electrode; and
    a fourth electrode,
    wherein the third alignment layer is disposed between the third electrode and the second liquid crystal layer, and
    the fourth alignment layer is disposed between the fourth electrode and the second liquid crystal layer.

17. The electronic device according to claim 1, wherein a thickness of at least one of the first liquid crystal layer and the second liquid crystal layer is less than 10 microns.

18. The electronic device according to claim 1, further comprising:
    a sealant surrounding the first liquid crystal layer.

19. The electronic device according to claim 1, further comprising:
    a sealant surrounding the second liquid crystal layer.

* * * * *